(12) United States Patent
Farrell

(10) Patent No.: US 6,741,741 B2
(45) Date of Patent: May 25, 2004

(54) SYSTEM AND METHOD FOR AUTOMATICALLY DETECTING EDGES OF SCANNED DOCUMENTS

(75) Inventor: Barbara L. Farrell, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 597 days.

(21) Appl. No.: 09/775,334

(22) Filed: Feb. 1, 2001

(65) Prior Publication Data

US 2002/0126899 A1 Sep. 12, 2002

(51) Int. Cl.$^7$ .............................. G06K 9/48; G06K 9/62
(52) U.S. Cl. ........................................ 382/199; 382/228
(58) Field of Search ................................ 382/173, 190, 382/172, 194, 199, 219, 221, 203, 228, 266, 272; 358/446, 449, 486, 487, 488, 504, 505; 250/559.42

(56) References Cited

U.S. PATENT DOCUMENTS

| | | | |
|---|---|---|---|
| 4,648,120 A | * 3/1987 | Chittineni | 382/266 |
| 4,910,786 A | * 3/1990 | Eichel | 382/199 |
| 5,170,440 A | * 12/1992 | Cox | 382/199 |
| 5,384,621 A | 1/1995 | Hatch et al. | 355/204 |
| 5,528,387 A | 6/1996 | Kelly et al. | 358/488 |
| 5,748,344 A | 5/1998 | Rees | 358/505 |
| 5,790,699 A | * 8/1998 | Jackson et al. | 382/199 |
| 5,805,294 A | 9/1998 | Furuoya | 358/296 |
| 5,850,474 A | * 12/1998 | Fan et al. | 382/173 |
| 5,995,661 A | * 11/1999 | Amidei | 382/199 |
| 6,005,683 A | * 12/1999 | Son et al. | 358/488 |
| 6,021,222 A | * 2/2000 | Yamagata | 382/199 |
| 6,046,828 A | * 4/2000 | Feng et al. | 358/488 |
| 6,166,394 A | 12/2000 | Rubscha | 250/559.42 |
| 6,618,171 B1 | * 9/2003 | Tse et al. | 358/446 |

* cited by examiner

Primary Examiner—Andrew W. Johns
Assistant Examiner—Amir Alavi
(74) Attorney, Agent, or Firm—William Eipert

(57) ABSTRACT

A method for identifying document edges collects a predetermined number scanlines of the document against a light backing and a dark backing. A first set of first-order statistics are calculated from the image data obtained by scanning the document against the light backing. A second set of first-order statistics are calculated from the image data obtained by scanning the document against the dark backing. A document edge is detected using the first and second sets of first-order statistics.

17 Claims, 12 Drawing Sheets

SYSTEM AND METHOD FOR AUTOMATICALLY DETECTING EDGES OF SCANNED DOCUMENTS

BACKGROUND OF THE INVENTION

The present invention relates to document scanning devices. More particularly, the present invention is directed to a system and method for automatically detecting the edge of a document being scanned by a scanning system.

In the reproduction of copies of an original document from video image data created, for example, by electronic input scanning from an original document, it is often desirable to provide functions dependent upon determining the exterior edges of the document. Such features include, for example, automatic location of the document in a scanning system, electronic registration and deskewing of the electronic image. Additionally, it is desirable to perform image processing routines only upon the image data of the document and not that corresponding to the backing, e.g., a platen cover in a platen scanning system or a backing plate, baffle, ski, or backing roll in a document feeding system, such a constant velocity transport ("CVT") system. Or in the case of an engineering scanner, choosing the right paper size. Furthermore, deletion of image data which falls outside the detected exterior edges of the document eliminates storing a document requiring more space than necessary.

In one method of determining the location of the document, a user would manually determine the document size and input the width, through a user interface, to the document scanning system before the document was actually scanned. In this method, the document must be centered in the document scanning system to avoid the document image from being clipped. This manual method reduces productivity and causes wasted copies, particularly when working with large documents such as are commonly seen in an engineering document scanning system wherein the input document can be quite small to slightly more than 36 inches, since a user cannot always input the correct width or center the document accurately in the document scanning.

Thus, it is desirable to provide an edge detection operation to determine the document's edges and position when the document is being initially staged for scanning. As should be appreciated, to provide an edge detection operation the exterior edges of the document must somehow be detected by the scanning system. Conventionally, automatic edge detection processes rely on the ability of the digital scanner and/or the image processing system to sense a difference, such as the difference in reflectance between the input document's background and the surrounding backing. However, existing edge detection methods have not been completely successful, particularly in an engineering environment wherein the document sheets can run the gamut of substrates from dark sepia to tracing paper to thick, bright bond paper to almost transparent film and can have reflectances very similar to the backing reflectance.

One such conventional auto-width detection method captures a portion of the lead edge of a document that is staged wherein the captured portion of the lead edge includes both image data related to the backing and the document itself. In this automated process, the width and position of a document is calculated by determining whether each CCD sensor element is covered by a backing or document. To make this determination, the conventional automatic detection method employs a classification process that utilizes the mean of columns of pixels of image data to differentiate between the document and the backing.

However, since the document's brightness varies from very dark to very bright and since most bond paper and film documents have about the same brightness as the backing, the conventional auto-width detection process often fails to detect the actual location and width of the document. Moreover, the conventional method relies solely on mean data, which corresponds to a first order function. The mean data is very susceptible to electrical noise within the CCD sensors or dust and dirt within the actual scanning system. In other words, any excessive electric noise, dust, or dirt could readily render the conventional edge detection process ineffective.

To eliminate the shortcomings associated with using a detection function based on a first order function, U.S. Pat. No. 6,046,828 teaches a method and system for providing automatic detection of the width and position of a document that filters the scanned image data and utilizes second order statistics to identify the transition between the backing and the document. While the system and method taught by U.S. Pat. No. 6,046,828 provides improved edge detection over conventional methods relying on mean data alone, several factors limit its effectiveness.

For example, in an ideal environment the backing has a constant reflectance; however, since it contacts the document it becomes dirty and scuffed causing vertical streaks to appear. Furthermore, problems with particular CCD elements or calibration could cause vertical streaks to appear. Additionally, as indicated above, documents such as engineering drawings can run the gamut of substrates from dark sepia to tracing paper to thick, bright bond paper to almost transparent film and can be in terrible condition with ragged, torn edges. All these factors confound efforts to detect document edges based on jumps in reflectance.

Therefore, it is desirable to have an effective automatic edge detection system that is robust enough to handle the varying conditions and the wide range of document substrates encountered.

SUMMARY OF THE INVENTION

One aspect of the present invention is a method for automatically detecting an edge of a document in a scanning system. The method includes (a) scanning a portion of the document against a substantially light reflecting backing to obtain a first set of image data; (b) scanning a portion of the document against a substantially light absorbing backing to obtain a second set of image data; (c) calculating a set of first values from the first set of image data, each one of the first values being a first-order statistic; (d) calculating a set of second values from the second set of image data, each one of the second values being a first-order statistic; and (e) determining a detected edge of the document from the set of first values and the set of second values.

In accordance another aspect of the present invention there is provided a method for detecting an edge of a document. The method includes: (a) scanning a portion of the document against a substantially light reflecting backing to obtain a first set of image data; (b) scanning a portion of the document against a substantially light absorbing backing to obtain a second set of image data; (c) calculating a set of first values from the first set of image data, each one of the first values being a first-order statistic; (d) calculating a set of second values from the second set of image data, each one of the second values being a first-order statistic; (e) calculating a set of third values from the second set of image data, each one of the third values being a second-order statistic; (f) calculating a set of fourth values from the second set of image data, each one of the fourth values being a fourth-order statistic; (g) determining a first edge detection from the set of first values and the set of second values; (h) determining a second edge detection from the set of first values and the set of second values; (i) determining a third edge detection from the set of first values, the set of second values and the set of fourth values; and (k) reconciling the first edge detection, the second edge detection and the third edge detection to obtain a document edge.

BRIEF DESCRIPTION OF THE DRAWINGS

The following is a brief description of each drawing used to describe the present invention, and thus, are being presented for illustrative purposes only and should not be limitative to the scope of the present invention, wherein.

DETAILED DESCRIPTION OF THE INVENTION

Figure 1:
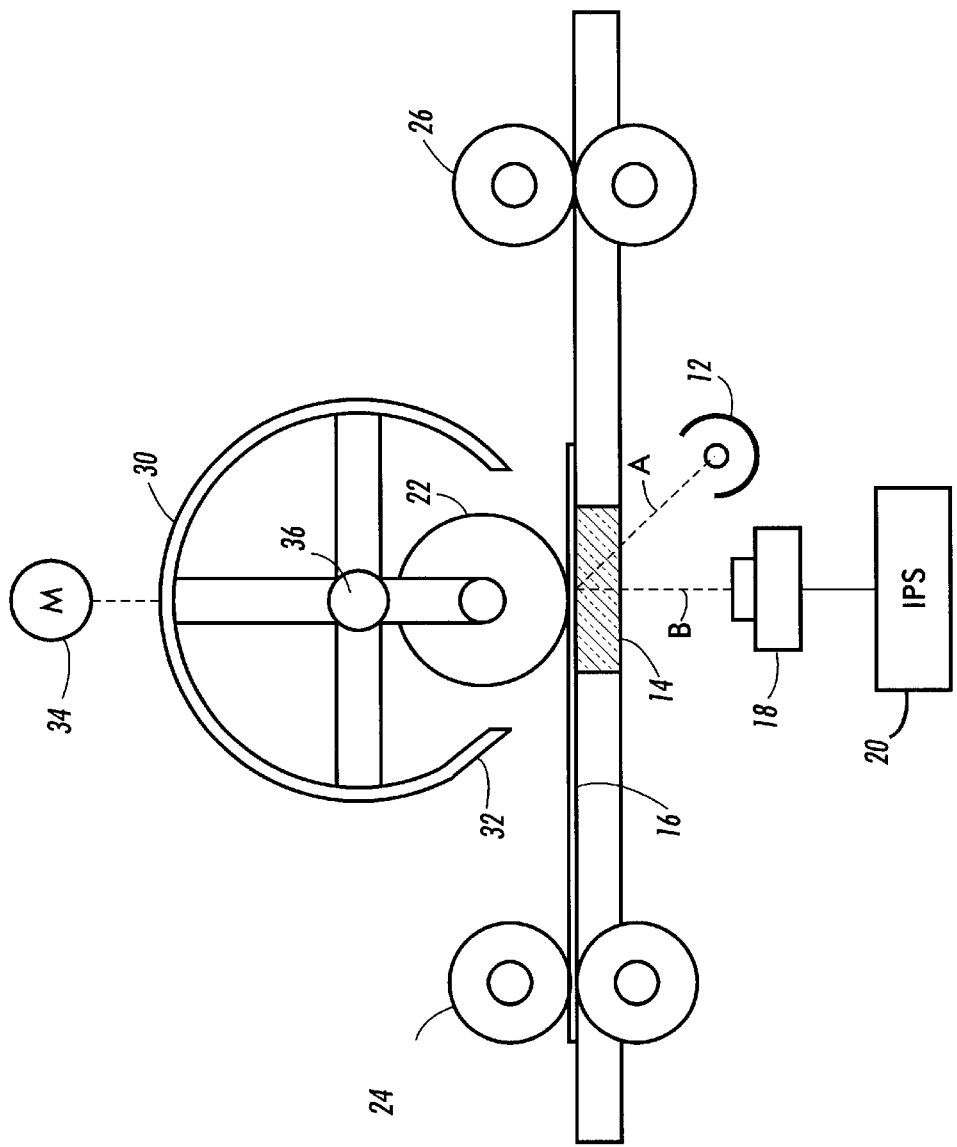
FIG. 1 is a schematic view of a portion of a document handler and imaging system operable in accordance with the teachings of the present invention.

The following will be a detailed description of the drawings illustrating the present invention. In this description, as well as in the drawings, like referenced numbers represent devices, circuits, or equivalent circuits which perform the same or equivalent functions. While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

In the following description, the terms fastscan direction and slowscan direction are utilized. Fastscan direction refers to the scanning of pixels along a scanline or raster. This is also commonly referred to as the electronic scan in that the scanning is a result of collecting image data from an array of photoelectric sensors. Slowscan direction, on the other hand, refers to the direction of the relative movement between the document and the scanning system. This is the mechanical movement that causes the scanning system to generate scanlines of image data. In the description herein the term "document" refers to image bearing sheet being imaged, and "sheet" refers to a usually flimsy physical sheet of paper, plastic, or other suitable physical substrate for images.

Turning now to FIG. 1, there is illustrated a schematic view of a portion of a document handler and imaging system 10 operable in accordance with the teachings of the present invention. Illumination source 12 generates light A which passes through platen glass 14 and is reflected off document 16 as reflected light B which is then received by sensor 18. Beneficially, sensor 18 comprises a raster input scanner (RIS) having a length sufficient to scan the entire width of the largest document supported by the handler. Sensor 18 is beneficially in the form of linear array of small photosensors such as CCD sensor elements. Sensor 18 receives the reflected light B and converts the reflected light into video data identifying the particular grey level value (e.g., a value from 0 to 255 for an eight bit system wherein a grey level of 0 represents black and a grey level of 255 represents white), for each pixel across the scanline. The video data is supplied to image processing system (IPS) 20 which operates on the image data to identify document edges in a manner described below.

Document 16 is passed over sensor 18 (platen glass 14) by backing roller 22 positioned to support document 16 against or in close proximity to the platen glass and provide a suitable image backing. Roller 22 is beneficially driven at a speed such that the surface of the roller moves with the document at exactly the same rate. In that way, the backing roller tends to neither accelerate nor impede the progress of the document over the platen. The outer surface of backing roller 22 is uniform in color, preferably white, so that the roller does not interfere with the images on transparent documents. As should be appreciated, to provide a suitable backing, roller 22 should cover the entire sensor 18. thus, when scanning a document, each CCD sensor element within sensor 18 is either covered by the backing or document. The system further includes transport rollers 24 to guide the original document to roller 22 and transport rollers 26 to carry the document from roller 22. In addition to guiding the document to and from the platen, transport rollers 24, 26 help hold the document tight across the platen glass.

Figure 2:
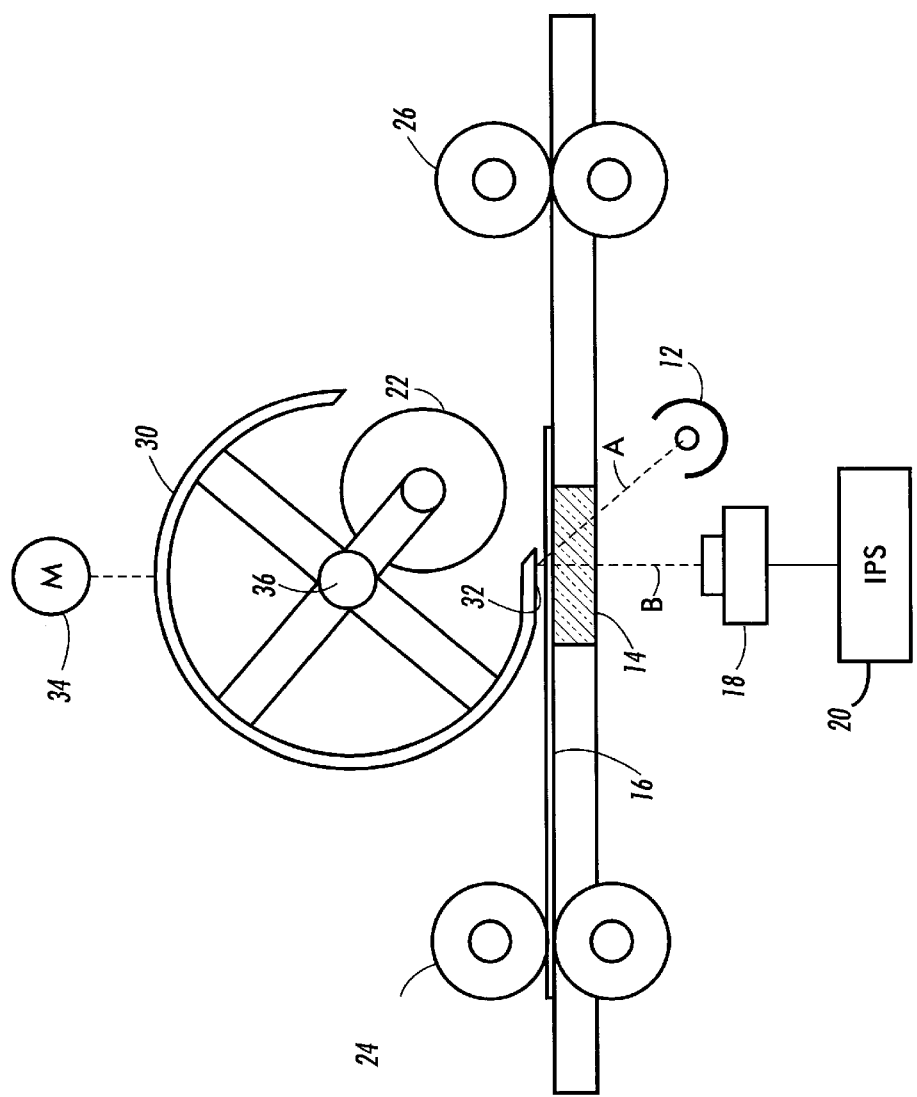
FIG. 2 is a schematic view of the document handler and imaging system of FIG. 1, positioned to scan with a detection backing.

Roller 22 is mounted in a substantially cylindrical housing 30 which is mounted to rotate about axis 36. A portion 32 of the outer surface of the housing 30 encompassing a section of the circumference of the outer surface forms a document width detection backing. Preferably, width detection backing 32 of the housing is slightly recessed from a truly cylindrical shape. For example, the width detection backing 32 may be a flattened segment of the outer surface of the otherwise cylindrical housing 30. Beneficially, the width detection backing of the housing is black. Housing 30 is driven by motor 34 which operates to rotate the housing about axis 36 to a position wherein the width detection backing 32 is in the field of view of, and facing illumination source 12 and sensor 18, as is shown in FIG. 2.

As noted above, detection backing 32 is preferably slightly recessed, so that it is beyond the focal point of the sensor. Thus, detection backing 32 appears out of focus to the sensor 18 such that variations in the surface of the width detection backing become less visible and that the surface appears more uniform in color and texture. Such uniformity of appearance reduces the possibility of incorrectly identifying variations in detection backing 32 as document edge-like features.

In one embodiment of an edge detection operation, the housing is positioned such that backing roller 22 is positioned over the platen. Document transport rollers 24, 26 guide a portion of document 16 over the platen wherein the document is scanned generating video image data comprising pixels of image data representing an image density. This partial scanning with backing roller 22 in place is performed to obtain a first set of image data comprising several scanlines of image data capturing the document against a light (e.g., white) backing. After this first portion of the document is scanned, motor 34 rotates housing 30 so that the width detection backing portion 34 in the field of view of sensor 18. An additional portion of document 16 is scanned with the edge detection backing in place to obtain a second set of image data comprising several scanlines of image data capturing the document against a dark (e.g., black) backing. IPS 20 operates on the two sets of image data to detect the edges.

An additional example of a document feeding system which may be used to scan a document against two different backings is described and shown in U.S. Pat. No. 6,166,394, to Robert F. Rubscha entitled "Dual Background Document Scanner to Eliminate Hole Printouts" and incorporated herein by reference.

Figure 3:
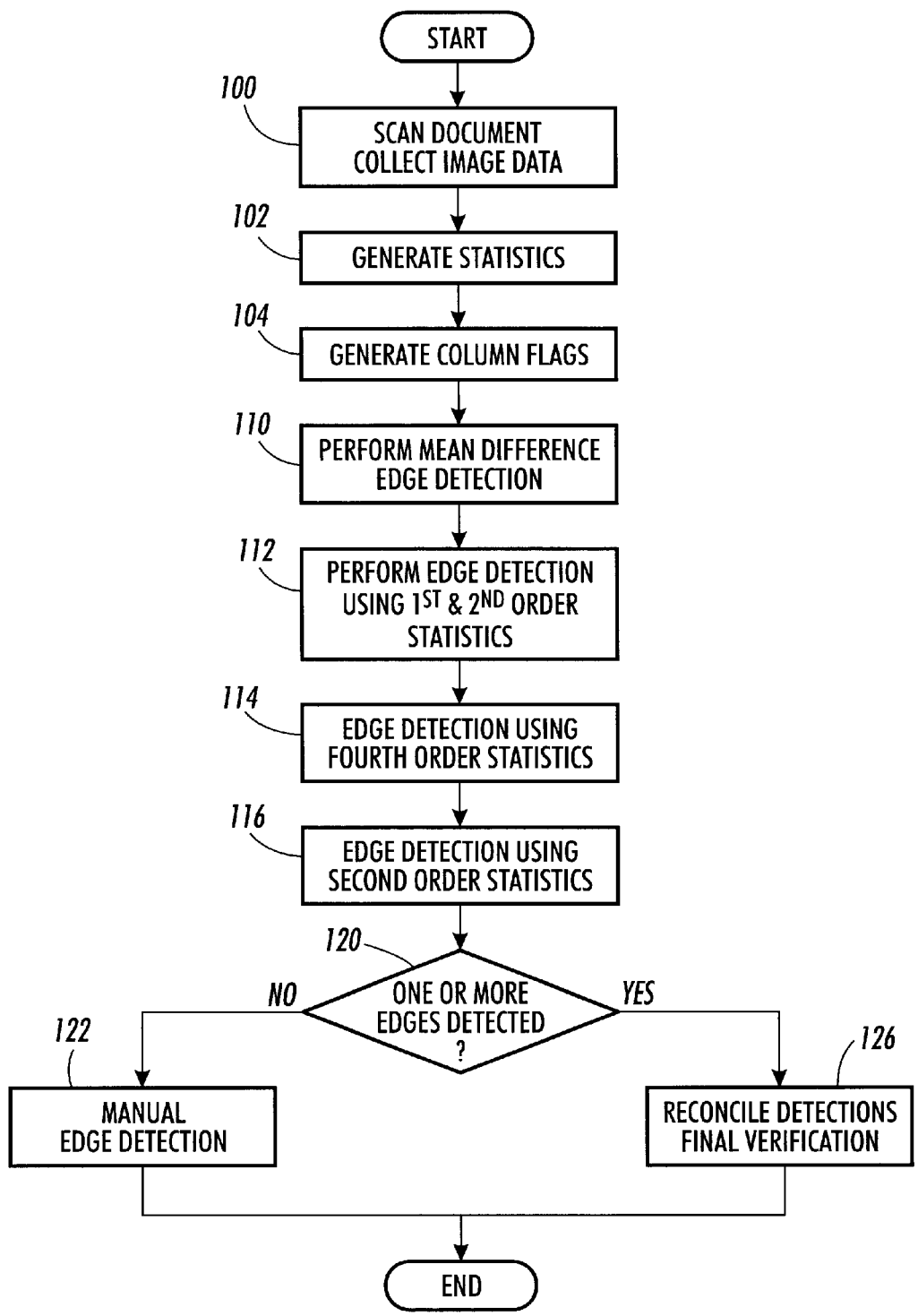
FIG. 3 is a flowchart illustrating an embodiment of a method to detect edges of a scanned document in accordance with the teachings of the present invention.

Referring now to FIG. 3, there is shown a flowchart illustrating one embodiment of a method to determine the edges of the document. Briefly, the method of FIG. 3, identifies the edges of the document using four edge detection operations. Each of the edge detection operations search for possible edges using one or more first-, second- and/or fourth-order statistics generated from the scanned image data. If an edge detection operation finds a possible edge, the operation provides the location of the detected edge. After completing the edge detection operations, the method determines if any of the possible edges detected corresponds to a document edge and, if so, where the document edge is located.

The process illustrated in FIG. 3 begins by scanning a section of the document to obtain prescan image data comprising pixels representing an image density. Specifically, step 100 scans a first portion of the document against a substantially light reflecting, light colored (e.g., white) backing, such as backing roller 22 (FIG. 1), to obtain a first set of image data, referred to herein as autoIQ (AIQ) image data. After scanning a first portion against a light backing, step 100 scans a second portion of the document against a dark (e.g., black) backing such as detection backing 32 (FIG. 2) to obtain a second set of image data, referred to herein as autoWidth (AW) image data. Beneficially, step 100 further includes a low-pass filter operation wherein the image data is low-pass filtered as it is collected. For example, the document can be scanned at 400 spi and averaged over a 4-pixel-wide window on each scanline to produce a 100-spi image. The low-pass filter operation acts to reduce any system noise as well as lessen the amount of image data that needs to be processed.

Figure 4:
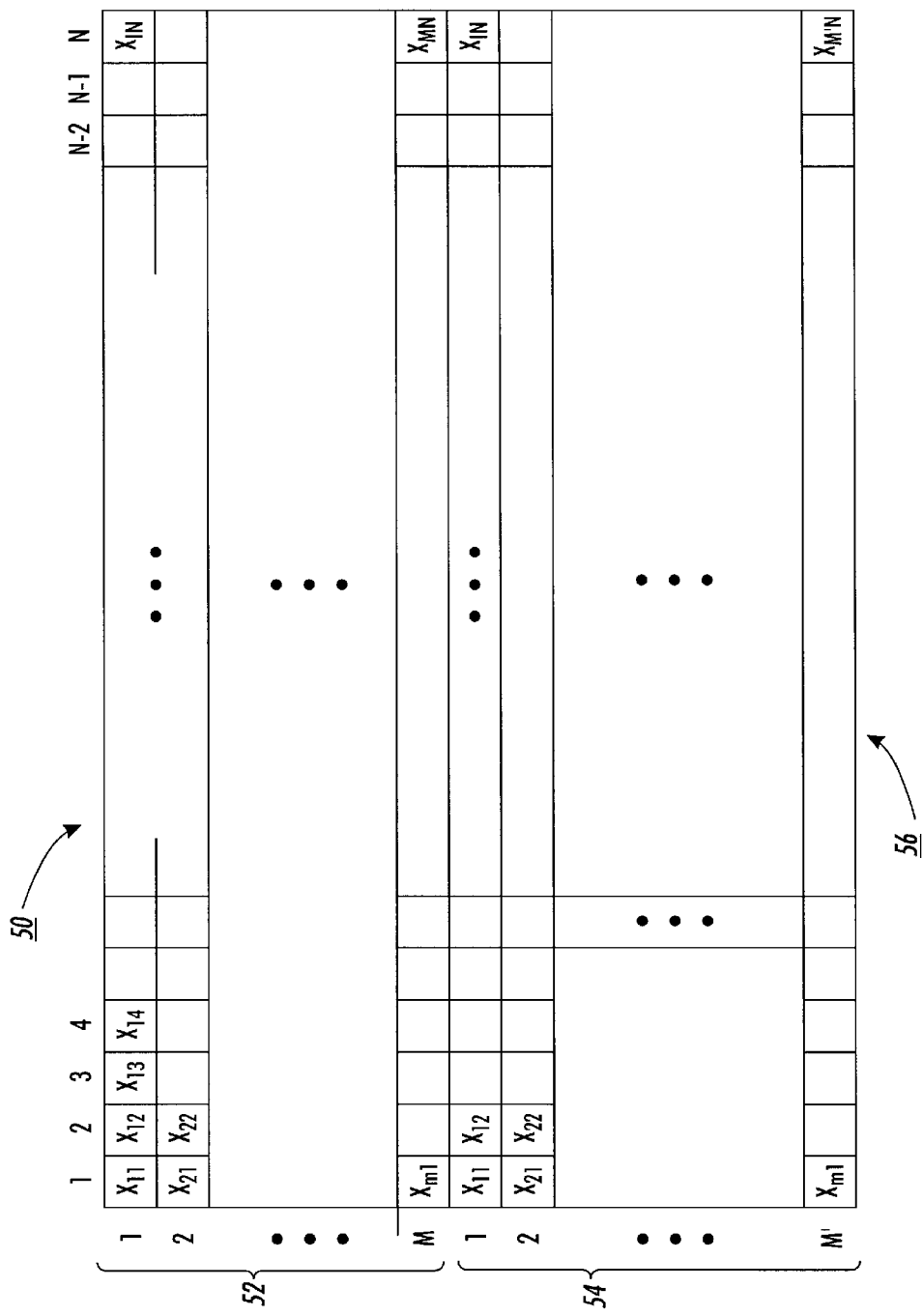
FIG. 4 is a graphical representation of prescan image data obtained in an embodiment of an edge detection process according to concepts of the present invention.

Turning to FIG. 4, there is shown a graphical representation of prescan image data 50 captured during step 100. Prescan image data 50 is shown as comprising two sets of image data, autoIQ image data 52 and autoWidth image data 54. AutoIQ image data 52 is shown as comprising M scanlines of pixel data with each scanline comprising N pixels and can be thought of as comprising an M×N matrix of pixels $x_{m,n}$ m=1 to M, n=1 to N. Similarly, AW image data 54 is shown as comprising M' scanlines of pixel data with each scanline comprising N pixels and can be thought of as comprising an M'×N matrix of pixels $x_{m',n}$ m'=1 to M', n=1 to N.

In one embodiment for scanning wide format documents such as engineering drawings, step 100 obtains about 70 scanlines of AIQ image data and a similar number of scanlines of AIQ image data obtained. However, it should be appreciated that the number of scanlines each of AIQ image data and AW image data obtained may vary depending on the desired performance characteristics. A minimum number of scanlines, such as 50–70 lines, should be scanned to ensure sufficient data to be able to accurately identify possible edges. As many lines as desired can be scanned, though one may want to limit the number of scanlines obtained to 70–100 lines such that the edge detection process does not take an exceptionally large amount of time.

Returning to FIG. 3, after a portion of the prescan image data is available, step 102 begins to generate values for first-, second- and fourth-order statistics from the prescan image data for use by one or more of the of four edge detection operations. More specifically, step 102 generates first-, second- and fourth-order statistics for each pixel column in the autoWidth image data and first-order statistics for each pixel column in the autoIQ image data. Beneficially the statistics compiled in step 102 include a column mean for pixel columns in the AW image data as well as for pixel columns in the AIQ image data and the standard deviation and kurtosis of pixel columns within the AW image data.

Using first-order statistics computed in step 102, step 104 generates column flags indicating whether a pixel column within the prescan image data corresponds to a narrow band artifact, corresponds to the width detection backing or is an auto-edge predictor. Briefly, a narrow band artifact is an "error" in the image data that results from dirt and/or streaks on the backing roll resulting in dark (low) grey levels for pixels corresponding to the white backing roll. Additionally, a narrow band artifact can result from a defective sensor which generates a white output for all pixels, thus causing a white band in image data corresponding to the black detection backing. Narrow band artifacts are identified by computing the mean of the near neighbor blocks and comparing the block means with the mean of the current column. If the column is identified as corresponding to a narrow band artifact, a narrow-band flag is set for that column.

An auto-edge predictor identifies pixel columns which are at or near the edge of the document. The auto-edge predictor looks for large differences between the mean of blocks of column means some distance ahead and some distance behind the current column. For the auto-edge predictor, compute the difference between the mean of the current column and the mean of a block of means in the near past. Compute the difference between the mean of the current column and the mean of a block of means in the near future. The auto-edge predictor looks for a large difference between them. If so, the auto-edge predictor is set as true (the column is near an edge boundary). This parameter is helpful in preventing false early edge detection due to artifacts in the white backing roller.

Another useful column type parameter to derive indicates whether a column corresponds to the width detection backing. This parameter also examines the means of blocks of column means neighboring the current pixel column to indicate if the current column corresponds to the detection backing. For the current column to correspond to detection backing, the difference between the means of the current column and near neighboring block column means must be small. The difference between the means of the far neighbor block means must also be small. The mean of the current column must also correspond to that expected of the detection backing. There must also be a large difference between corresponding future far neighbor blocks in the white backing roller vs. the black detection backing. The parameter is also useful in preventing false early edge detection due to artifacts in the white backing roller.

After generating image statistics, the process searches for possible edges using the statistics. As indicated above, the process includes four edge detection operations (steps 110, 112, 114 and 116) searching for possible edges. Each edge detection operation is independent of the others, and although the operations are shown as being performed in series, it is understood that the edge detection operations can be performed in parallel. At step 110, the process searches for a possible edge using the values for first-order statistics generated at step 102. More specifically, step 110 detects possible edges by comparing the difference of means between the AW and AIQ image data of the current column to that of nearby pixel columns. If a possible edge is detected, step 110 examines the status of selected column flags to confirm the detection. If the detection is confirmed, the location of the detected edge is provided.

Step 112 uses the first- and second-order statistics generated at step 102 to detect possible edges and provide the column corresponding to the location of the detected edge, if one is found. In particular, step 112 detects possible edges using the first derivative (i.e., slope) of the change in the values for first-order and second-order statistics. If a possible edge is detected, the status of column flags are examined to confirm the detection.

Step 114 searches for possible edges using the values of the fourth-order statistics generated at step 102. If a possible edge is detected, step 114 confirms the detection of the edge against selected column flags and, if confirmed, provides the location of the detected edge. Step 116 searches for a possible edge using the values for second-order statistics generated at step 102 and confirms the identification of a possible edge by examining the status of selected column flags. If the detection is confirmed, the location of the detected edge is provided.

At step 120, the process determines if any possible edges have been detected. If not, the process continues with step 122 wherein the scanning system indicates that no edge was detected and requests manual entry of document width. If any possible edges have been identified, the process continues with step 126 wherein the process determines which of the possible edge detections, if more than one has been identified, corresponds to the actual document edge. After identifying the document edge, step 126 also verifies that the detected document edge is valid.

Attention will now be turned to describing in detail selected steps in the method to determine the edges of the document shown in FIG. 3. The method shown in FIG. 3 and the associated figures discussed below can be used to identify both left and right edges. For example, referring to FIG. 4, when searching for a left edge, the process begins in the left most pixel column, column 1, and moves towards column N, i.e., moving in a left to right manner. To locate a right edge, the process simply beings with the right most column and moves across the prescan image data in a right to left manner, with the columns being renumbered 1 to N from right to left. For edge confidence, the process looks for the left edge of the document from column 1 to half the maximum allowed document width+the minimum allowed document width. After the left edge has been determined, the process looks for the right document edge starting with the right most column down to the identified left edge+the minimum document width.

Figure 5:
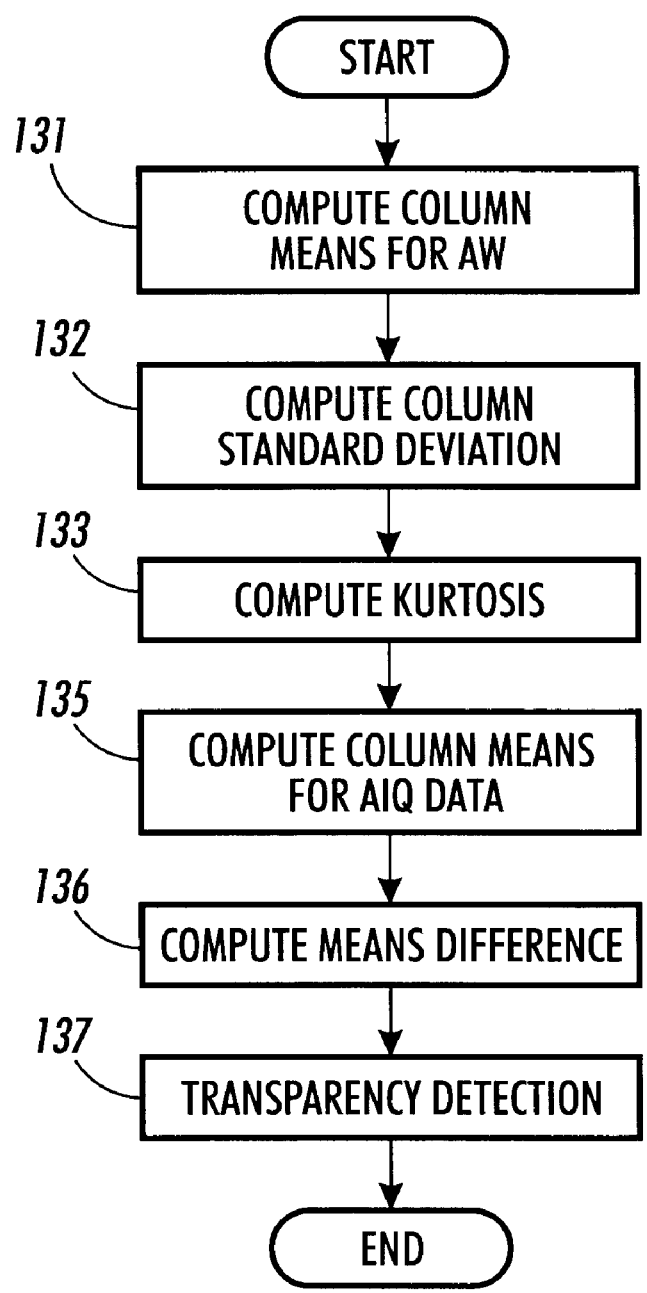
FIG. 5 illustrates an embodiment of a process for compiling statistics from prescan image data.

Turning now to FIG. 5, there is shown in more detail the process of generating first-, second- and fourth-order statistics from the prescan image data carried out in step 102 of FIG. 3. At step 131, the mean of each of the N columns of pixel data within the AW image data (dark backing) is computed and stored. For example, if the AW image data contains M'=50 scanlines, the column of pixels for pixel location 56, for example, would contain 50 pixels of image data wherein each pixel of image data was produced by the same unit sensor element. More specifically, referring to FIG. 4, for each column of pixels n for n=1 to N within the AW image data 54, such as column 56, step 131 calculates the mean, $\text{Mean}_{AW}(n)$, of the pixel values $x_{m',n}$ for m'=1 to M' in that column of pixels. That is, the column mean value, $\text{Mean}_{AW}(n)$, is given by:

$$\text{Mean}_{AW}(n) = \sum_{m'=1}^{M'} x_{m',n} / M' \qquad (1)$$

After calculating the mean, step 132 computes the standard deviation of each of the N columns of pixel data within the AW image data. As used herein $\text{Std}_{AW}(n)$ identifies standard deviation of the pixel values $x_{m',n}$ for m'=1 to M' in column n in the AW image data.

Step 133 uses the means and standard deviations computed in steps 131 and 132 to determine the kurtosis of each of the N columns of pixel data within the AW image data. Kurtosis is the a measure of the degree of "peakedness" of a distribution. The kurtosis reflects the degree to which the sample population is distributed in the tails of the distribution with respect to a normal distribution. A large positive value (high peak) in the distribution means the data is concentrated about the mean (leptokurtic). For reference, kurtosis is zero for a normal distribution. As used herein $K_{AW}(n)$ identifies the kurtosis of column n in the AW image data.

In step 135 first order statistics are also calculated from the autoIQ image data. Beneficially, in step 135 the mean of each of the N columns of pixel data within the AIQ image data (white backing roller) is computed and stored. That is, for each column of pixels n for n=1 to N within the AIQ image data 52, step 135 calculates the column mean, $\text{Mean}_{AIQ}(n)$, of the pixels $x_{m,n}$ for m=1 to M in that column of pixels.

After calculating the column means for each column of pixels in the autoIQ image data and the autoWidth image data, step 136 computes the absolute difference in mean value for each column in the autoWidth image data ($\text{Mean}_{AW}(n)$) with the mean for the corresponding column in the autoIQ image data ($Mean_{AIQ}(n)$). The absolute difference in mean values computed at step 136 is given by:

$$Mean_{Diff}(n) = abs[Mean_{AIQ}(n) - Mean_{AW}(n)] \quad (2)$$

In order to help differentiate between transparencies and dark documents, step 137 accumulates a running count of the column mean values for the autoWidth image data ($Mean_{AW}(n)$) which are less than or equal to a threshold grey level. If the total number of column mean values having a grey level value less than a threshold value is large enough, then it is presumed that the document is a transparency and a transparency detected flag "transp-detected" will be set true. As the edges of transparencies typically are not reliably detected, if a transparency is detected the process will "fail" and request manual entry of the document width. As an additional check for detecting transparencies, the auto-backer flag will also flag transparent documents as backer to prevent transparency edge detection.

The threshold grey level value for detecting transparencies is selected based upon the average grey level of the width detection backing used and the grey level expected for dark documents. Similarly, the number columns having a mean less than the threshold required for setting the transparency detected flag true can be determined empirically from examination of typical transparency and dark documents used with the scanning system. In one embodiment, a scanning system for engineering documents using a black width detection backing, required 90% or more of the columns have a mean less than the average grey level of the detection backing in order to set the transparency detected flag true.

Figure 6:
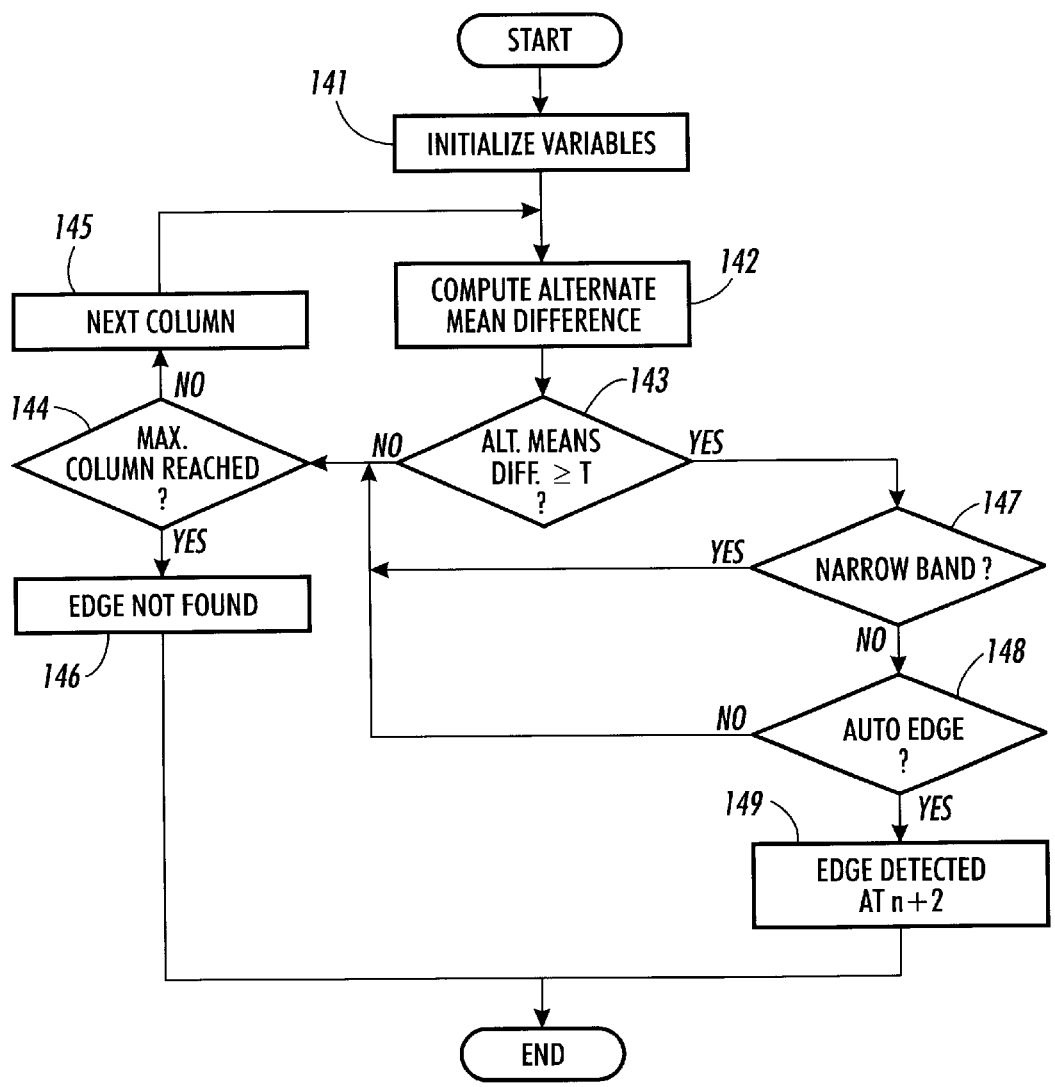
FIG. 6 is a flowchart illustrating an embodiment of edge detection operation based on a difference in mean values in accordance with the teachings of the present invention.

FIG. 6 shows in more detail the edge detection operation carried out in step 110 of FIG. 3. As described above, the method shown in FIG. 6 can be used to identify left and right edges. As discussed above, when searching for a left edge, the process begins in the left most pixel column 1 and moves column N, i.e., scanning in a left to right manner. To locate the right edge, the process simply identifies the right most column and moves across the prescan image data in a right to left manner, with the columns being renumbered 1 to N from right to left.

At step 141, the process initializes the current column n to 1 and sets the maximum column to search. For edge confidence, the process only looks for the left edge of the document from column 1 to half the maximum document width plus the minimum allowed document width. After the left edge has been determined, the process begins looking for the right edge of the document starting from the extreme right edge (column N) down to the left edge plus the minimum allowed document width.

At step 142, the process compares the mean difference for the current column, $Mean_{Diff}(n)$, to the mean difference for the column 2 columns in the future, i.e., towards the document. More specifically, step 142 determines the absolute difference between the mean difference for the current column and the mean difference for the column 2 columns in the future as:

$$AltMean_{Diff}(n) = abs[Mean_{Diff}(n) - Mean_{Diff}(n+2)] \quad (3)$$

When the prescan image data corresponds to a backing, the mean difference of a column will be large (it is the difference between the AIQ image data (white backing roll) and the AW image data (black width detection backing)) although the mean difference from column to column will be relatively equal. Similarly, when a column of prescan image data corresponds to the document, the mean difference should be relatively small since both the AIQ image data and the AW image data correspond to the document. However, at the document edge boundary, the mean difference of the current column (n) will be large since it is the difference between the two prescan image backings (the white backing roll and the black width detection backing) while the mean difference two columns in the future (n+2) should be small since both the AIQ image data and the AW image data correspond to the document. Thus, one would expect see a sharp peak in the $AltMean_{Diff}$ at document.

At step 143, the process determines if the $AltMean_{Diff}$ is greater than a threshold value (MnDiff-Thresh1). The threshold value can be empirically derived from training documents representative of the actual documents encountered in the scanning system. In one embodiment, a threshold in the range of 12–17 was used, however, those skilled in the art will be appreciate that threshold values in other ranges may be used. If the $AltMean_{Diff}$ is not greater than the threshold, the process determines if the maximum search column was reached at step 144. If not, the process increases the current column count (step 145) and computes a new $AltMean_{Diff}$. If the maximum search column is reached, the process indicates that an edge was not detected. On the other hand, if the $AltMean_{Diff}$ is greater than or equal to the threshold, a possible edge has been detected and the process continues with step 147.

The comparison of the mean difference of neighboring columns provides excellent edge prediction for a wide range of document types. However, to ensure that the detection is not the result of a narrow band artifact, the process includes a check designed to identify if the current column corresponds to a narrow band artifact at step 147. Beneficially, step 147 determines if either the current column or the next column has been identified as corresponding to a narrow band artifact (i.e., the narrow-band flag is set). If so, the process rejects the detection as being a narrow band and returns to step 144 to continue searching for an edge. Otherwise, the process continues with step 148 wherein an auto-edge verification is performed.

Step 148 determines if the current column is an auto-edge predictor column (step 104 of FIG. 3). If so, the process, at step 149, determines that an edge exist at column n+2. If the current column is not an auto-edge predictor column, the process rejects the detection and returns to step 144 to continue searching for an edge.

Figure 7:
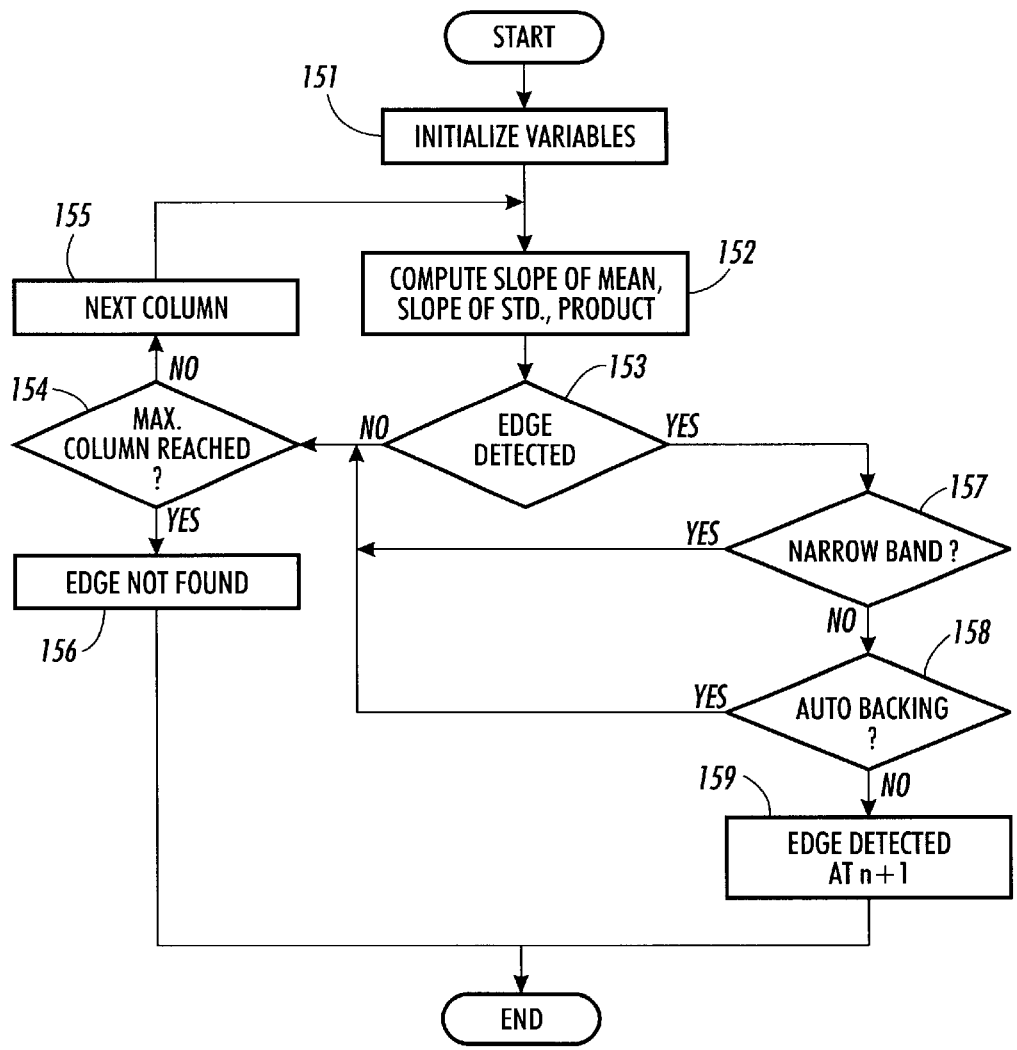
FIG. 7 illustrates an embodiment of a process for edge identification based on first- and second-order statistics according to concepts of the present invention.

FIG. 7 shows in more detail the edge detection operation carried out in step 112 of FIG. 3. As described above, the method shown in FIG. 7 can be used to identify left and right edges by moving through the prescan image data in either a left to right or right to left manner. At step 151, the process initializes the current column n=1 and sets the maximum column to search. For edge confidence, the process only looks for the left edge of the document from column 1 to half the maximum document width plus the minimum allowed document width. After the left edge has been determined, the process begins looking for the right edge of the document starting from the extreme right edge (column N) down to the left edge plus the minimum allowed document width.

At step 152, the process generates four edge prediction values each of which is generated using statistics for the autoWidth image data. The first two prediction values generated are the first derivative (slope) of the change in mean values (Mean 1st) and the first derivative of the change in standard deviation for adjacent columns (Std1st). The values for Mean1st and Std1stare computed using the mean and standard deviation values generated in step 102 of FIG. 3. Beneficially, the process determines Mean1st(n) as the absolute difference in mean values between the column two columns ahead of the current column and the column one column ahead minus the difference in means values between the column one column ahead and the current column. That is:

$$Mean1st(n)=abs[Mean_{AW}(n+1)-Mean_{AW}(n+2)]-abs[Mean_{AW}(n)-Mean_{AW}(n+1)]\qquad(4)$$

Similarly, Std1st(n) is computed as the difference in standard deviation values between column (n+2) and column (n+1) minus the difference in standard deviation between the column (n+1) and the current column (n). That is:

$$Std1st(n)=[Std_{AW}(n+2)-Std_{AW}(n+1)]-[Std_{AW}(n+1)-Std_{AW}(n)]\qquad(5)$$

Large changes in standard deviation are often seen at document edges. The first derivative of the change in standard deviation yields a large, positive peak when there is a large, positive change in standard deviation between columns (n+2) and (n+1) and little change between columns (n) and (n+1).

Having generated the two slope values, step 152 computes the third edge prediction value as the absolute value of product of Std1st(n) and Mean1st(n). This product of Std1st(n) and Mean1st(n) is referred to as Prod1st:

$$Prod1st(n)=abs[Mean1st(n)*Std1st(n)]\qquad(6)$$

The fourth edge prediction value used in this operation is the sum of the standard deviations for a block of x columns starting y columns in the future, i.e. toward the document. In one embodiment, x and y were determined to be in a range from 10 to 20 and a range from 20 to 30, respectively. However, those skilled in the art will readily determine values for x and y based on the system requirements. Specifically, the fourth edge prediction value is:

$$SumStd(n)=Std_{AW}(n+y)+Std_{AW}(n+y+1)+Std_{AW}(n+y+2)+\ldots Std_{AW}(n+x)\qquad(7)$$

At step 153, the process determines if one the following 3 conditions is met:

Prod1st(n)>PThrsh1 AND SumStd(n)>SSThrsh1 OR

Prod1st(n)>PThrsh2 AND abs[Std1st(n)]>StdThrsh1 OR

Prod1st(n)>PThrsh3 AND abs[Ssd1st(n)]>StdThrsh1 AND SumStd(n)>SSThrsh2 (8)

wherein the threshold values can be determined empirically from documents representative of the actual documents encountered in a given scanning system. In one embodiment, PThrsh1 and PThrsh2 were both in the range of 30–40, and PThrsh3 was in the range of 10–20; SSThrsh1 and SSThrsh2 were both in the range of 30–40; and StdThrsh1 and StdThrsh2 were approximately 3. The second condition is a bit more stringent than first condition, e.g., PThrsh2 is slightly larger than PThrsh1 and StdThrsh1 is fairly high. Since the third condition looks at three prediction values, the requirements are slightly relaxed—PThrsh3 is smaller than PThrsh1 and PThrsh2, StdThrsh2 is smaller than SThrsh1, SSThrsh2 is somewhat higher than SSThrsh1.

If none of the conditions given in equation (8) above is met, then a possible edge has not been detected, and the process continues at step 154 wherein it is determined if the maximum search column was reached. If the maximum search column is not reached, the process increases the current column (step 155) and returns to step 152 to compute four new edge prediction values for the new column. If the maximum search column is reached, process indicates that an edge was not identified (step 156). On the other hand, if any one of the three conditions given in equation (8) above is met, a possible edge has been detected and the process continues with step 157.

At step 157, the process determines that either the current column or the next column has been identified as corresponding to a narrow band artifact (i.e., the narrow-band flag is set). If so, the process rejects the detection as being a narrow band and returns to step 154 to continue searching for an edge. If not, the process continues with step 158 wherein the process determines if current pixel column corresponds to the width detection backing.

If step 158 determines that the current pixel column does not correspond to the detection backing, the process, at step 159, determines that an edge exists at pixel column n+1. If the current column corresponds to the detection backing, the process rejects the detection and returns to step 154 to continue searching for an edge.

Figure 8:
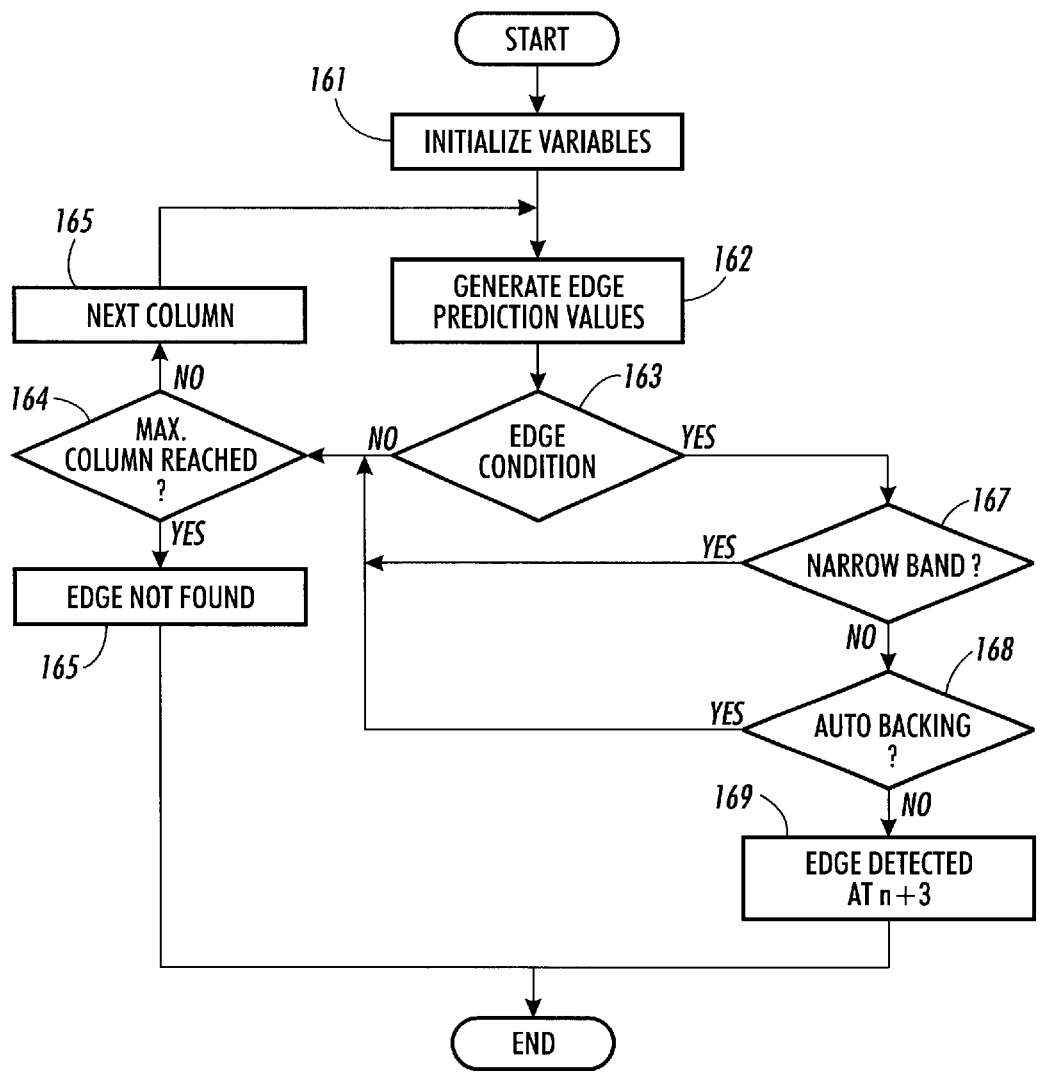
FIG. 8 shows an edge identification operation that uses fourth-order statistics according to concepts of the present invention.

Turning now to FIG. 8 there is shown a process for carrying out the edge detection operation of step 114 of FIG. 3. As described above, the process of FIG. 8 can be used to identify left and right edges. When searching for a left edge, the process begins in the left most pixel column and moves in a left to right manner through the prescan image data. To locate the right edge, the process simply begins with the right most column identified as column 1 and moves across the data in a right to left manner.

The process of FIG. 8, begins at step 161 with the initialization of search variables—current column and maximum column to search. As discussed above, the process need only look for the left edge of the document from column 1 to half the maximum document width plus the minimum allowed document width. After the left edge has been determined, the process begins looking for the right edge of the document starting from the extreme right edge (column N) down to the left edge plus the minimum allowed document width.

At step 162, the process generates the two edge prediction values used in the detection operation. The first prediction value generated is the first derivative of the change in the kurtosis values (K1st). Specifically, K1st is determined as the difference of the kurtosis value for the column two columns ahead of the current column and that of the column one column ahead less the difference in the kurtosis values between the column one column ahead and the current column. That is:

$$K1st(n)=[K_{AW}(n+2)-K_{AW}(n+1)]-[K_{AW}(n+1)-K_{AW}(n)]\qquad(9)$$

The second edge prediction value generated at step 162 is AltMean$_{Diff}$(n). Recall that the AltMean$_{Diff}$(n), as given in equation (3), is the absolute difference between the mean difference for the current column and the mean difference for the column 2 columns in the future. At step 163, the process identifies an edge detection if the following condition is met:

AltMean$_{Diff}$(n)≧MnDiff−Thresh2; AND abs[K1st(n+1)]>KThresh1 OR abs[K1st(n+2)]>KThresh1 (10)

wherein the threshold values MnDiff−Thresh2 and KThresh1 were determined empirically from documents representative of the actual documents encountered in the scanning system. In one embodiment, MnDiff−Thresh2 was relaxed slightly from MnDiff−Thresh1 used in the mean difference edge detection in step 110 in FIG. 3 to a range from 10–15 and KThresh1 was in a range from 25–30;

however, as will be appreciated by those skilled in the art, the threshold values may vary greatly.

If the condition given in equation (10) above is not met, a possible edge has not been detected, and the process continues at step 164 wherein it is determined if the maximum search column was reached. If the maximum search column is not reached, the process increases the current column (step 165) and returns to step 162 to compute two new edge prediction values for the new column. If the maximum search column is reached, process indicates that an edge was not identified (step 166). On the other hand, if the condition given in equation (10) is met, a possible edge has been detected and the process continues at step 167.

At step 167, the process determines if the current column or any of the neighboring columns correspond to a narrow band artifact. If step 167 determines that either the current column or the next column has been identified as corresponding to narrow band artifact (i.e., the narrow-band flag is set), the process rejects the detection as being a narrow band and returns to step 164 to continue searching for an edge. If not, the process continues with step 168 wherein the process determines if current pixel column corresponds to the width detection backing.

If step 168 determines that the current pixel column does not correspond to the width detection backing, the process, at step 159, determines that a possible edge exists at column n+3. On the other hand, If the current pixel column corresponds to the width detection backing, the process rejects the detection and returns to step 164 to continue searching for an edge.

Figure 9:
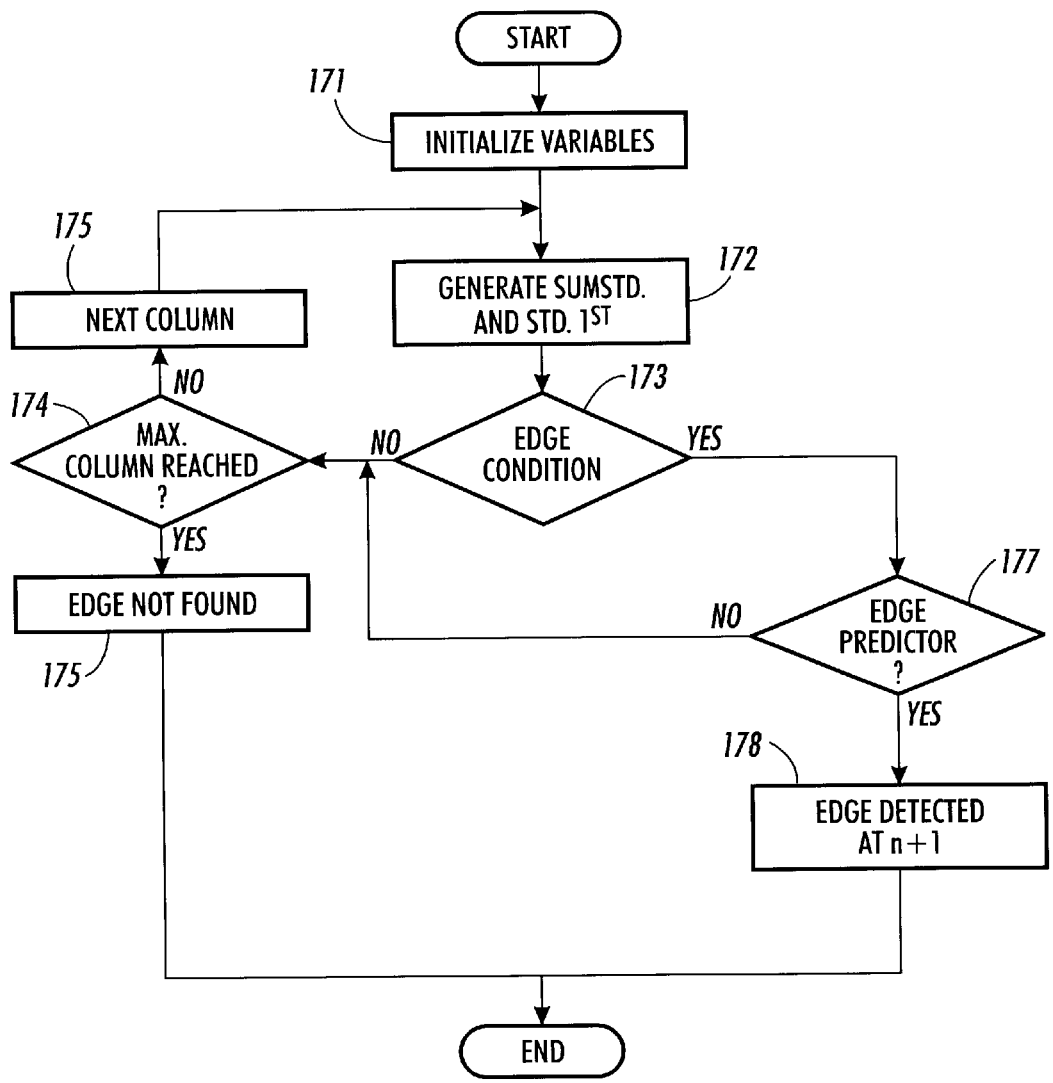
FIG. 9 shows a process for carrying out a fourth edge identification operation according to concepts of the present invention.

Turning to FIG. 9 there is shown a process for carrying out the edge detection operation of step 116 of FIG. 3. As described above, the process can be used to identify left and right edges by moving through the prescan image data in either a left to right or right to left manner. The process begins at step 171 with the initialization of variables. The current column is initiated and the maximum column to search is set.

At step 172, the process generates the two edge prediction values needed for the edge detection operation. The first prediction value generated is Std1st, the first derivative of the change in the standard deviation values. As described above, and given in equation (5), Std1st(n) is computed as the difference in standard deviation values between column (n+2) and column (n+1) minus the difference in standard deviation between the column (n+1) and the current column (n). The second edge prediction value used in the process of FIG. 9, is SumStd(n). Recall that the SumStd(n), as given in equation (7) is the sum of the standard deviations for a block of x columns starting y columns in the future.

At step 173, the process identifies an edge detection if the following condition is met:

$$abs[Std1st(n)] > StdThrsh3 \text{ AND } SumStd(n) > SSThrsh3 \quad (11)$$

wherein the threshold values StdThrsh3 and SSThrsh3 were determined empirically from documents representative of the actual documents encountered in the scanning system. In one embodiment, SSThrsh3 was 30; and StdThrsh3 was 3.

If the condition given in equation (11) above is not met, a possible edge has not been identified, and the process continues at step 174 wherein it is determined if the maximum search column was reached. If the maximum search column is not reached, the process increases the current column (step 175) and returns to step 172 to compute two new edge prediction values for the new column. If the maximum search column is reached, process indicates that an edge was not identified (step 176). On the other hand, if the condition given in equation (11) is met, a possible edge has been detected and the process continues with step 177.

To be a valid edge, the current column must also be an auto-edge predictor column (i.e., the auto-edge flag is set). Thus, step 177 determines if the current column is an auto-edge predictor. If so, the process, at step 178, determines that an edge exists at column n+1. If the current column is not an auto-edge predictor column, the process rejects the detection and returns to step 174 to continue searching for an edge.

Figure 10:
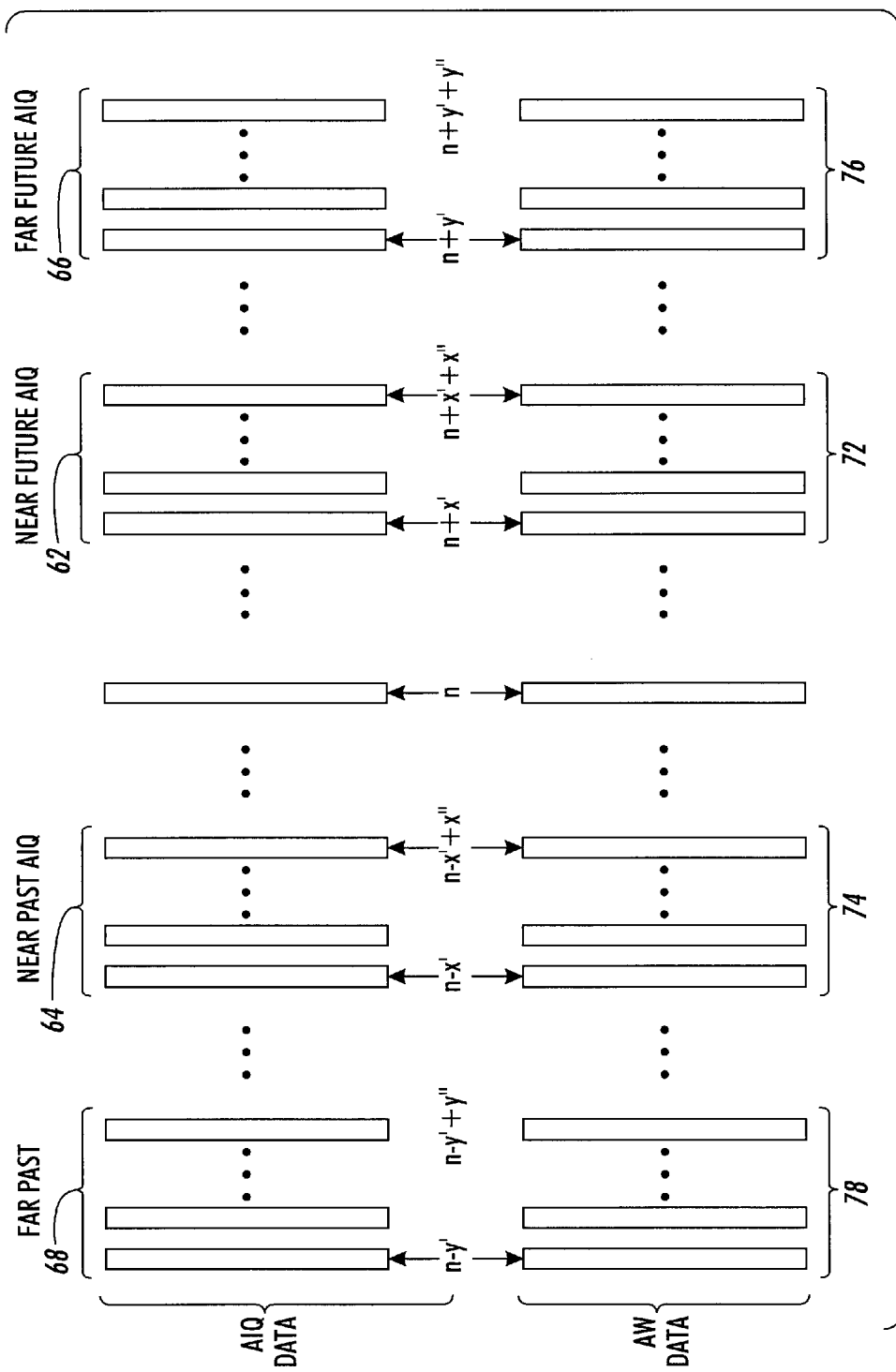
FIG. 10 is a schematic representation of prescan image data used in determining column type parameters according to concepts of the present invention.

Before turning to a discussion of the determination the narrow-band artifact, detection-backing and auto-edge flags, a description of the prescan image data used in generating these column flags will be provided. FIG. 10 provides a schematic representation of the portion of prescan image data used in determining column flags. The generation of the column flags uses a pair of near neighbor blocks of column means surrounding the current column in the AIQ image data (blocks 62 and 64) and a corresponding pair of blocks of column means in the AW image data (blocks 72 and 74). Additionally, the process relies on a pair of far neighbor blocks of column means surrounding the current column in the AIQ image data (blocks 66 and 68) and a corresponding pair of blocks of column means in the AW image data (blocks 76 and 78).

The corresponding pair of near neighbor blocks 62 and 72 are identified herein as NearFuture$_{AIQ}$ and NearFuture$_{AW}$, respectively, and each comprises a block of x" column means beginning x columns in the future i.e., towards the document. That is, each of the NearFuture blocks comprise column means for pixel columns n+x to n+x+x". The corresponding pair of near neighbor blocks 64 and 74 are identified herein as NearPast$_{AIQ}$ and NearPast$_{AW}$, respectively. Each of these NearPast blocks comprising a block of column means beginning x' columns in the past and including the next x" columns into the future. That is, each NearPast block comprises column means for pixel columns n−x' to n−x'+x".

The pairs of far neighbor blocks maintain the same relationship. That is, the corresponding pair of far neighbor blocks 66 and 76 (identified herein as FarFuture$_{AIQ}$ and FarFuture$_{AW}$, respectively) each comprises a block of y" column means beginning y columns in the future (i.e., the block including columns n+y to n+y+y"). The corresponding pair of far neighbor blocks 68 and 78 are identified herein as FarPast$_{AIQ}$ and FarPast$_{AW}$, respectively, with each comprising a block beginning y' columns in the past and including the next y" column means into the future (i.e., the block including columns n−y' to n−y'+y").

The size and position of each of the near and far neighbor blocks can be determined empirically from analyzing image data corresponding to documents representing the range of expected documents for the scanning system. In one embodiment, x and x' were determined to be 5, x" was identified as 3, y and y' were determined to be 20 and y" was identified as 5. Note the asymmetry in the neighbor blocks, it was determined empirically from the data and enables finding narrow bands close to the document edge.

Figure 11:
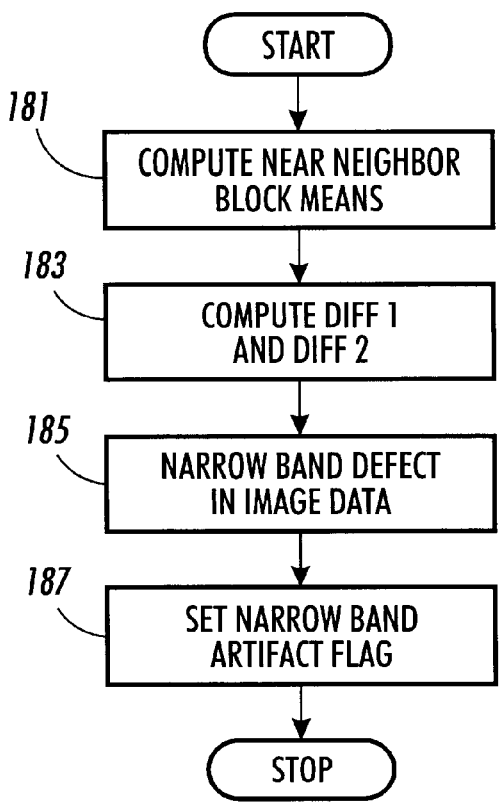
FIG. 11, shows an embodiment of a process for determining if a pixel column corresponds to a narrow band artifact.

FIG. 11, shows one embodiment of a process for determining if a pixel column corresponds to a narrow band artifact such as is carried out in step 104 of FIG. 3. The process of FIG. 11, begins at step 181 with the computation of the mean value of each of the near neighbor blocks NearFuture$_{AIQ}$, NearPast$_{AIQ}$, NearFuture$_{AW}$, and NearPast$_{AW}$. Given the block means for the near neighbor blocks, the process determines the difference between the block means and the mean of the current column (step 183). That is, the following values are computed:

$$Diff1_{AIQ}(n)=Mean_{AIQ}(n)-Mean(NP_{AIQ}) \quad (12)$$

$$Diff2_{AIQ}(n)=Mean_{AIQ}(n)-Mean(NF_{AIQ}) \quad (13)$$

$$Diff1_{AW}(n)=Mean_{AW}(n)-Mean(NP_{AW}) \quad (14)$$

$$Diff2_{AW}(n)=Mean_{AW}(n)-Mean(NF_{AW}) \quad (15)$$

wherein Mean($NP_{AIQ}$), Mean($NF_{AIQ}$) are the means of the near neighbor blocks of column mean values for the blocks NearPast$_{AIQ}$, NearFuture$_{AIQ}$; and Mean($NP_{AW}$), Mean ($NF_{AW}$) are the means of the near neighbor blocks of column mean values for the blocks NearPast$_{AW}$, NearFuture$_{AW}$.

At step 185, the process determines if a narrow band is present in the image data (both the AIQ and AW image data) for the current column. The criteria for establishing that narrow band is present in the autoIQ image data comprise the following conditions: (a) The difference between the mean of the current column and the mean of the near neighbor blocks is large, e.g., abs(Diff1$_{AIQ}$), abs(Diff2$_{AIQ}$) $\geq 6$; AND (b) both Diff1$_{AIQ}$, Diff2$_{AIQ}$ have the same sign i.e., the mean of the current column is either much lower than or much higher than the mean of BOTH near-neighbor blocks; AND (c) the difference between the means of the near neighbor blocks, abs(Diff1$_{AW}$–Diff2$_{AW}$) is small (e.g., <3). If each of the above conditions is met, then a narrow band has been identified in the AIQ image data.

Similarly the above criteria are applied to the autoWidth image data. That is, if each of the following conditions are met: (a) abs(Diff1$_{AW}$), abs(Diff2$_{AW}$)$\geq 6$; AND (b) both Diff1$_{AW}$, Diff2$_{AW}$ have the same sign i.e., the mean of the current is either much lower than or much higher than the mean of BOTH near-neighbor blocks; AND (c) abs (Diff1$_{AW}$–Diff2$_{AW}$) is small (e.g., <3), then a narrow band is present in the AW image data.

Having determined if a narrow band is present in either the AIQ or the AW image data, the process continues with step 187 wherein a final decision of whether the column corresponds to a narrow band artifact is made based on the current state of the AIQ and AW image data and also the history of narrow band identification. First, if a narrow band is present in the AIQ image data for the current column or either of the previous two columns, the current AIQ column is flagged as a "narrow band artifact." Second, if a narrow band has been detected in the AW image data for the current column or either of the previous two columns, the current AW column is flagged as a "narrow band artifact." If a narrow band artifact flag is set for either the AIQ or the AW column, but not both, then the current column is identified as corresponding to a narrow band artifact (i.e., the narrow-band flag is set).

In addition to the determination of whether the current column or next two columns correspond to a narrow band artifact included in the edge detection operation of FIGS. 6, 7 and 8 as described above, the use of the narrow-band flag can be used as a final check for all edge detection operations. Beneficially, for all edge detection operations, if after an edge has been detected, if a narrow band is found in either of the next 2 columns, the edge is discarded, and edge detection resumes.

Figure 12:
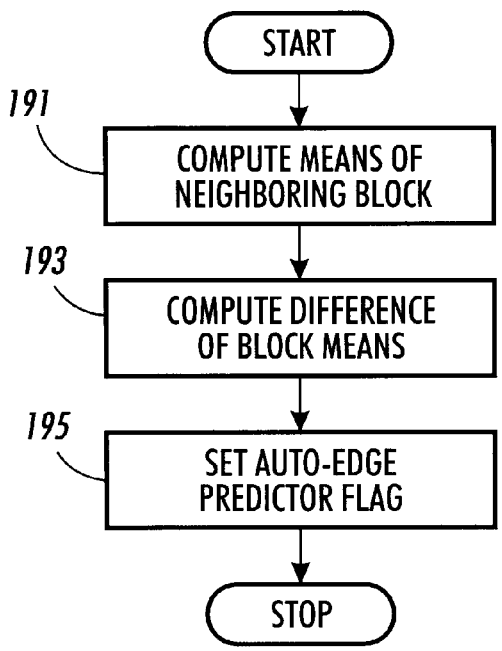
FIG. 12, illustrates an embodiment of a process for determining if a pixel column is an auto-edge predictor column.

FIG. 12, shows one embodiment of a process for determining if a pixel column is an auto-edge predictor column. The process of FIG. 12, begins at step 191 with the computation of the block mean value of each of the near neighbor blocks in the autoWidth image data, NearFuture$_{AW}$, and NearPast$_{AW}$, and the each of the far neighbor blocks in the autoWidth image data, FarFuture$_{AW}$, and FarPast$_{AW}$. When computing the block mean of the near neighbors, the process simply computes the mean (average) of the columns within the block. However, when computing the mean of the far neighbor blocks, the process drops the high and low column means for the block and uses the remaining column means in determining the block mean.

At step 193, the difference between the block means for the far neighbors and the difference between the block means for the near neighbors and the current column are computed. That is:

$$NearBlockDiff_{AW}=abs[(Mean(NP_{AW})-Mean_{AW}(n))-(Mean(NF_{AW})-Mean_{AW}(n)] \quad (16)$$

$$FarBlockDiff_{AW}=abs[Mean(FP_{AW})-Mean(FF_{AW})] \quad (17)$$

wherein Mean($NP_{AW}$), Mean($NF_{AW}$) are the means of the near neighbor blocks of column mean values for the blocks NearPast$_{AW}$, NearFuture$_{AW}$ and Mean($FP_{AW}$), Mean($FF_{AW}$) are the means of the far neighbor blocks of column mean values for the blocks FarPast$_{AW}$ and FarFuture$_{AW}$.

At step 195, the process identifies the status of the column as being an auto-edge predictor or not based on the differences computed in step 193. Specifically, if both NearBlockDiff$_{AW}$ and FarBlockDiff$_{AW}$ are greater than a threshold value of grey levels. That is, if the column is at or near the edge boundary between backer material and actual document then the mean of the neighbor blocks in the future should reflect the document and that of the blocks in the past should reflect the black backer and thus the difference would be large. In one embodiment, a threshold difference of greater than 30 grey levels was been determined to provide good auto-edge predictor performance.

Figure 13:
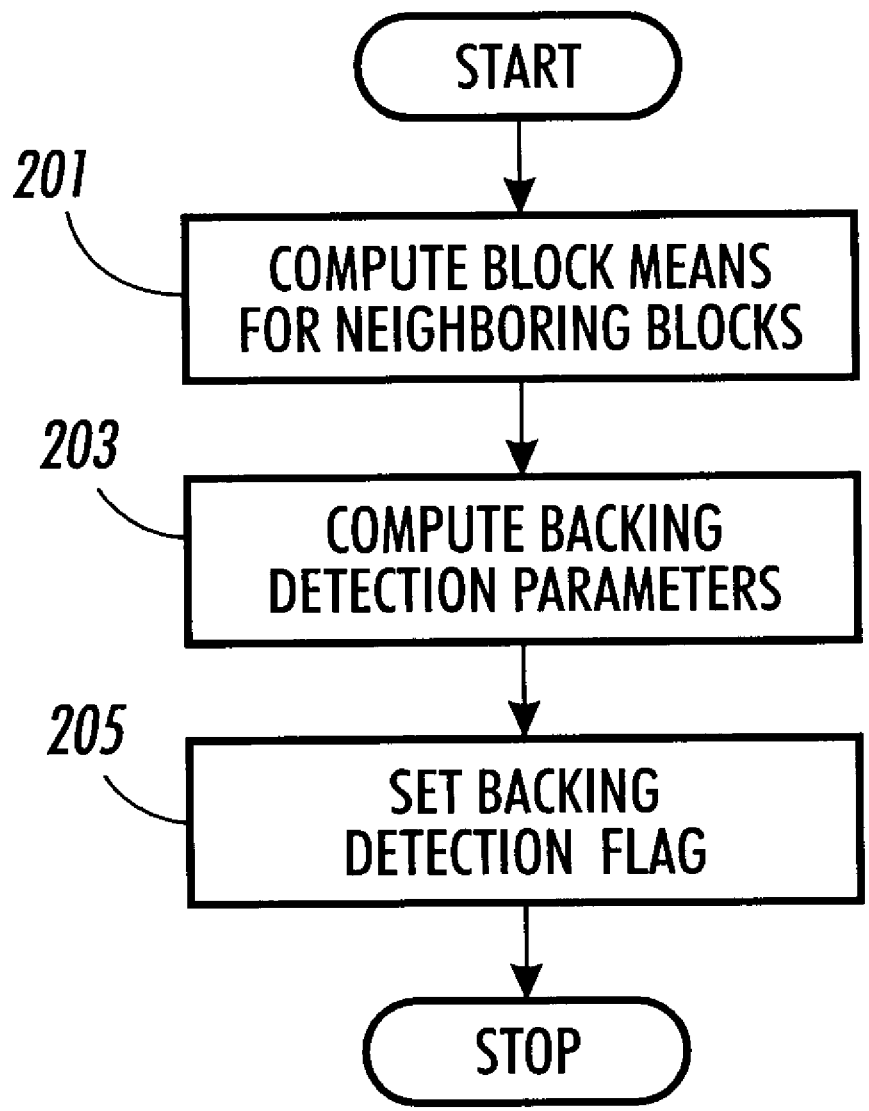
FIG. 13, shows an embodiment of a process for determining if a pixel column corresponds to the detection backing.

FIG. 13, shows one embodiment of a process for determining if a pixel column corresponds to the width detection backing. The process of FIG. 13, begins at step 201 with the computation of the block mean values Mean($NP_{AW}$), Mean ($NF_{AW}$) for the near neighbor blocks of column mean values NearPast$_{AW}$, NearFuture$_{AW}$. Step 201 also computes the block mean values Mean($FP_{AW}$), Mean($FF_{AW}$) for the far neighbor blocks of column mean values FarPast$_{AW}$, FarFuture$_{AW}$. Additionally, step 201 computes the block mean values Mean($FP_{AIQ}$), Mean($FF_{AIA}$) for the far neighbor blocks of column mean values FarPast$_{AIQ}$, FarFuture$_{AIQ}$.

As described above, when computing the block mean of the near neighbors, the process simply computes the mean (average) of the columns within the block. However, when computing the mean of the far neighbor blocks, the process drops the high and low column means within the block and uses the remaining column means in determining the block mean.

The process continues at block 203 wherein backing detection parameters are computed from the block mean values computed in step 201. Generally, the difference in the mean of the far-neighbor blocks will be small if both blocks correspond to the width detection backing. Likewise, the difference between the current column and its near-neighbor blocks will also be small. Furthermore, one would expect that the mean of the far-neighbor blocks would be low if the image data corresponds to the width detection backing. Additionally, if the image data does correspond to backing, the difference in grey levels between the autoWidth and the autoIQ image data should still be large (white backing vs. black backing). Given the above, step 203 computes the following backing detection parameters: FarBlockDiff$_{AW}$ (given by equation (17)); Diff1$_{AW}$ and Diff2$_{AW}$ (equations (14) and (15)); and the block mean difference between the AIQ and AW image data for the far future blocks according to:

$$FFBlockMean_{Diff}=Mean(FF_{AIQ})-Mean(FF_{AW}) \quad (18)$$

At step 205, the process uses block means and the backing detection parameters to determine if the current column corresponds to the width detection backing. Specifically, if the following conditions given by equation (19) are met the current column corresponds to the detection backing:

$$FarBlockDiff_{AW} \leq BlockThrsh \text{ AND}$$

$$Diff1_{AW}, Diff2_{AW} \leq BlockThrsh \text{ AND}$$

$$Mean(FP_{AW}), Mean(FF_{AW}) < BackerThrsh$$

$$FFBlockMean_{Diff} > DarkDocThrsh \quad (19)$$

The last condition in equation (19) prevents very dark documents from incorrectly being identified as corresponding to the detection backing. For very dark documents, there will be a very small difference in grey levels in the document area between the AutoWidth and AutoIQ prescans. The grey level difference in the document area would be large for transparent documents, (white backing show-through vs. black backing show-through) and this, coupled with small differences in grey levels between the black backer and the document (black backer showing through) in the AutoWidth image data, will identify transparencies as corresponding to the width detection backing and thus deliberately preventing edge detections.

In one embodiment, a BlockThrsh in the range of 3–5, a BackerThrsh of 20 and a DarkDocThrsh of 60 was used. However, those skilled in the art will recognize that other values may be used based upon the system requirements.

In addition to the use of the width detection backing flag in the detection operations of FIGS. 7 and 8, the detection backing column flag is useful for finding false edges identified by any of the detection operations. More specifically, after any detection operation identifies an edge, if skipping more than the equivalent number of columns corresponding to the width of the white stripe present on one edge of some transparencies in the scanning system into the future it is determined that the image data corresponds to the detection backing, then the edge is discarded. This additional fail-safe check is useful for detecting transparencies (where edge detection is unreliable).

It should be appreciated that with four different detection operations in use (i.e., steps 110, 112, 114, and 116), four different edge detections may be identified. To reconcile any conflicts, step 126 of FIG. 3, performs a detection precedence operation. One example of an edge detection precedence operation which may be carried out by step 126 is discussed below. In discussing the detection precedence operation, the detection operation of step 110 will be referred to as detection test 1, the operation of step 112 will be referred to as detection test 2, the operation of step 114 will be referred to as detection test 3 and the operation of step 116 will be referred to as detection test 4.

(A) If only one of the detection tests identifies an edge, the edge detection identified by that detection operation determines the document edge—if a transparency has not been identified.

(B) If detection test 1 did not find an edge, the following precedence rules apply:
  (1) If only two of the three other detection tests identify a document edge, then the earliest detected edge will operate as the document edge. However, if test 2 is the earliest edge detection and a transparency was detected, then no edge is declared.
  (2) if all three of the other detection operations identify, if the edge identified by detection test 2 agrees with either the edge identified in test 3 or test 4 then the edge detected in test 2 will determine the document edge. Otherwise, the earliest detected edge of the three tests will determine the document edge if the other two tests do not agree.

(C) If detection test 1 identifies an edge and only one other detection test identifies an edge, then test 1 will always take precedence.

(D) The final situation is when detection test 1 (rule 7) identifies an edge and 2 or more other tests have also identified edges. In this case the following rules apply:
  (1) If all of the rules have been triggered:
    a) The detection of test 2 can override that of test 1 if the detection of tests 2 and 3 agree and they are earlier than that of test 1; or if the detection of test 2 is the earliest and none of the other rules agree with one another and the standard deviation values of future columns (n+3, n+4, n+5) are small, e.g., less than 50, then the edged detection of test 2 will take precedence over that of test 1 if no transparency has been detected.
    b) The detection of test 3 can override that of test 1 if the detection of test 3 it is the earliest detection and the other tests do not agree and the standard deviation values of columns (n+3, n+4, n+5) are small.
    c) For any other combination, the detection of test 1 prevails.
  (2) The edge detection of tests 3 and 4 will not override that of test 1 if test 2 has not identified an edge.
  (3) If detection tests 1, 2 and 4 are the only tests to identify an edge, then:
    a) If all three detection tests agree or test 1 is the earliest, then the edged detected in test 1 will prevail as the document edge.
    b) The edge detected in test 2 will override that of test 1 if the detection of tests 2 and 4 agree and they are earlier than that of test 1 or if the edge detection of test 2 is the earliest and none of the other rules agree with one another and the standard deviation values of columns (n+3, n+4, n+5) are small and a transparency has not been identified, then the edged detection of test 2 will take precedence over that of test 1.
    c) If the detection of test 4 is the earliest and the detection of tests 1 and 2 (Rules 7 and 9) do not agree and the standard deviation values of columns (n+3, n+4, n+5) are small, the detection of test 4 will override that of test 1 to identify the document edge.
  (4) If the detection tests 1, 2 and 3 have each identified an edge, if the detection of test 3 is the earliest and the detection of tests 1 and 2 don't agree, then the detection of test 3 (rule 8) will override that of test 1.

After reconciling the edge detections using an detection precedence operation, the process of step 126 performs a final edge verification operation to determine the confidence in the identified document edge. If the document edge was not found by detection tests 1 and 2, there is lower confidence in the document edge. To assure the document edge corresponds to the actual physical document edge, the process looks for a high standard deviation (e.g., >25.0) at the document edge by examining near neighbor columns (beneficially, columns (n+3), (n+4), (n+5)). A high standard deviation for these near neighbor columns indicates that there is text/line art at the edge. If there is, the document edge has probably been detected too late, i.e., the detected edge is within the document. In such a case, the detected document edge is ignored.

What has thus been described is a method for automatically detecting the edges of scanned documents. The method relies on simple statistics to enable software to run in real time for identification of edges. Furthermore, the use of simple statistics reduces costs and increases speed when implementing the method in hardware. Although the present invention has been described in detail above, various modifications can be implemented without imparting from the spirit. For example, the present invention has been described with respect to a system having 255 grey levels. However, the system can be easily applicable to any number of grey levels.

While the present invention has been described with reference to various embodiments disclosed above, it is not confined to the details to support the above, but is intended to cover such alternatives, modifications, and variations as may come within the scope of the attached claims.

What is claimed is:

1. A method for detecting an edge of a document being scanned, comprising:
   (a) scanning a portion of the document against a substantially light reflecting backing to obtain a first set of image data;
   (b) scanning a portion of the document against a substantially light absorbing backing to obtain a second set of image data;
   (c) calculating a set of first values from the first set of image data, each one of the first values being a first-order statistic;
   (d) calculating a set of second values from the second set of image data, each one of the second values being a first-order statistic; and
   (e) determining a detected edge of the document from the set of first values and the set of second values.

2. The method of claim 1, wherein step (e) comprises:
   (e1) determining a set of first difference values, each one of the first difference values being the difference between one of the first values and one of the second values;
   (e2) determining a second difference value, the second difference value being the difference between two of the first difference values; and
   (e3) identifying the detected edge when the second difference value is greater than a threshold value.

3. The method according to claim 2, wherein:
   step (c) calculates a first mean value for each one of selected columns of pixels within the first set of image data; and
   step (d) calculates a second mean value for each for each one of selected columns of pixels within the second set of image data.

4. The method according to claim 1, further comprising:
   (f) calculating a set of third values from the second set of image data, each one of the third values being a second-order statistic;
   (g) determining a second detected edge of the document from the set of third values; and
   (h) reconciling the detected edge and the second detected edge to obtain a document edge.

5. The method according to claim 4, wherein step (g) comprises:
   (g1) determining a first slope value, the first slope value being a function of the difference between a plurality of the third values;
   (g2) generating a block sum value, the block sum value comprising the sum of a plurality of third values; and
   wherein the second detected edge is identified from the first slope value and the block sum.

6. The method according to claim 5, wherein step (g) further comprises:
   (g3) determining a second slope value, the second slope value being a function of the difference between a plurality of the second values; and
   (g4) computing a product of the first slope value and the second slope value;
   wherein the second detected edge is identified from the product, the first slope value and the block sum.

7. The method according to claim 1, further comprising:
   (f) calculating a set of third values from the second set of image data, each one of the third values being a fourth-order statistic;
   (g) determining a second detected edge of the document from the set of third values; and
   (h) reconciling the detected edge and the second detected edge to obtain the document edge.

8. The method according to claim 7, wherein step (g) comprises:
   (g1) determining a first slope value, the first slope value being a function of the difference between a plurality of the third values;
   (g2) determining a set of first difference values, each one of the first difference values being the difference between one of the first values and one of the second values; and
   (g3) determining a second difference value, the second difference value being the difference between two of the first difference values;
   wherein the second detected edge is identified from the first slope value and the second difference value.

9. The method according to claim 1, further comprising:
   (f) calculating a plurality of block values, each block value comprising a mean of a plurality of second values; and
   (g) verifying the detected edge using the plurality of neighbor block values.

10. The method according to claim 9, wherein step (f) comprises:
    (f1) calculating a first block value, the first block value comprising a mean of a first plurality of second values;
    (f2) calculating a second block value, the second block value comprising a mean of a second plurality of second values; and
    (f3) computing a first block difference value, the first block difference value comprising an arithmetic difference between the first block value and the second block value;
    wherein step (g) verifies the detected edge when the first block value is greater than a first block difference threshold.

11. The method according to claim 10, wherein step (f) further comprises:
    (f4) calculating a third block value, the third block value comprising a mean of a third plurality of second values;

(f5) calculating a fourth block value, the fourth block value comprising a mean of a fourth plurality of second values; and (f6) computing a second first block difference value, the second block difference value comprising an arithmetic difference between the third block value and the fourth block value;

wherein step (g) verifies the detected edge when the first block value is greater than a first block difference threshold and the second block value is greater than a second block difference threshold.

12. The method according to claim 1, further comprising:

(f) calculating a plurality of first block values, each of the first block values comprising a mean of a plurality of first values;

(g) calculating a plurality of second block values, each second block value comprising a mean of a plurality of second values; and (h) verifying the detected edge using the first plurality of block values and second plurality of block values.

13. The method according to claim 12, wherein step (h) comprises:

(h1) calculating a plurality of first difference values, each of the first difference values comprising an arithmetic difference between one of the first block values and a selected pixel column;

(h2) calculating a plurality of second difference values, each of the second difference values comprising an arithmetic difference between one of the second block values and the selected pixel column;

(h3) confirming the detected edge when each of the first and second difference values are greater than a threshold value.

14. A method for detecting an edge of a document being scanned, comprising:

(a) scanning a portion of the document against a substantially light reflecting backing to obtain a first set of image data;

(b) scanning a portion of the document against a substantially light absorbing backing to obtain a second set of image data;

(c) calculating a set of first values from the first set of image data, each one of the first values being a first-order statistic;

(d) calculating a set of second values from the second set of image data, each one of the second values being a first-order statistic;

(e) calculating a set of third values from the second set of image data, each one of the third values being a second-order statistic;

(f) calculating a set of fourth values from the second set of image data, each one of the fourth values being a fourth-order statistic;

(g) determining a first edge detection from the set of first values and the set of second values;

(h) determining a second edge detection from the set of first values and the set of second values;

(i) determining a third edge detection from the set of first values, the set of second values and the set of fourth values; and (k) reconciling the first edge detection, the second edge detection and the third edge detection to obtain a document edge.

15. The method according to claim 14, wherein step (g) comprises:

(g1) determining a set of first difference values, each one of the first difference values being the difference between one of the first values and one of the second values;

(g2) determining a second difference value, the second difference value being the difference between two of the first difference values; and (g3) identifying the first edge detection when the second difference value is greater than a threshold value.

16. The method according to claim 14, wherein step (h) comprises:

(h1) determining a first slope value, the first slope value being a function of the difference between a plurality of the third values;

(h2) generating a block sum value, the block sum value comprising the sum of a plurality of third values;

(h3) determining a second slope value, the second slope value being a function of the difference between a plurality of the second values; and (h4) computing a product of the first slope value and the second slope value;

wherein the second edge detection is identified from the product, the first slope value and the block sum.

17. The method according to claim 14, wherein step (i) comprises:

(i1) determining a first slope value, the first slope value being a function of the difference between a plurality of the fourth values;

(i2) determining a set of first difference values, each one of the first difference values being the difference between one of the first values and one of the second values; and (i3) determining a second difference value, the second difference value being the difference between two of the first difference values;

wherein the third edge detection is identified from the first slope value and the second difference value.

\* \* \* \* \*